(12) United States Patent
Scott et al.

(10) Patent No.: US 11,802,786 B2
(45) Date of Patent: Oct. 31, 2023

(54) VARIABLE MASS BALANCE BAR

(71) Applicant: MICRO MOTION, INC., Boulder, CO (US)

(72) Inventors: Kevin M. Scott, Longmont, CO (US); Anthony William Pankratz, Arvada, CO (US)

(73) Assignee: MICRO MOTION, INC., Boulder, CO (US)

( * ) Notice: Subject to any disclaimer, the term of this patent is extended or adjusted under 35 U.S.C. 154(b) by 12 days.

(21) Appl. No.: 17/628,013

(22) PCT Filed: Jul. 30, 2019

(86) PCT No.: PCT/US2019/044055
§ 371 (c)(1),
(2) Date: Jan. 18, 2022

(87) PCT Pub. No.: WO2021/021116
PCT Pub. Date: Feb. 4, 2021

(65) Prior Publication Data
US 2022/0268613 A1 Aug. 25, 2022

(51) Int. Cl.
*G01F 1/84* (2006.01)
(52) U.S. Cl.
CPC .................. *G01F 1/8418* (2013.01)

(58) Field of Classification Search
None
See application file for complete search history.

(56) References Cited

U.S. PATENT DOCUMENTS

| 5,979,246 | A | * | 11/1999 | Van Cleve | ............ | G01F 1/8418 73/861.357 |
| 6,439,060 | B1 | * | 8/2002 | Cage | ........................ | G01F 1/849 73/861.357 |
| 6,769,163 | B2 | | 8/2004 | Van Cleve | | |
| 2012/0055260 | A1 | * | 3/2012 | Lanham | ................ | G01F 1/8418 29/428 |

FOREIGN PATENT DOCUMENTS

| WO | 0102815 A1 | 1/2001 |
| WO | 2010138111 A1 | 12/2010 |

* cited by examiner

*Primary Examiner* — Paul M. West
*Assistant Examiner* — Mark A Shabman
(74) *Attorney, Agent, or Firm* — The Ollila Law Group LLC

(57) ABSTRACT

A variable mass balance bar (120-320, 520-820) is provided. The variable mass balance bar (120-320, 520-820) comprises a balance body (122-322b, 522-822) containing a balance fluid (124-324b, 524-824), wherein a mass of the balance fluid (124-324b, 524-824) is selected to balance a measuring conduit (110-310, 510-810) containing a process material.

26 Claims, 8 Drawing Sheets

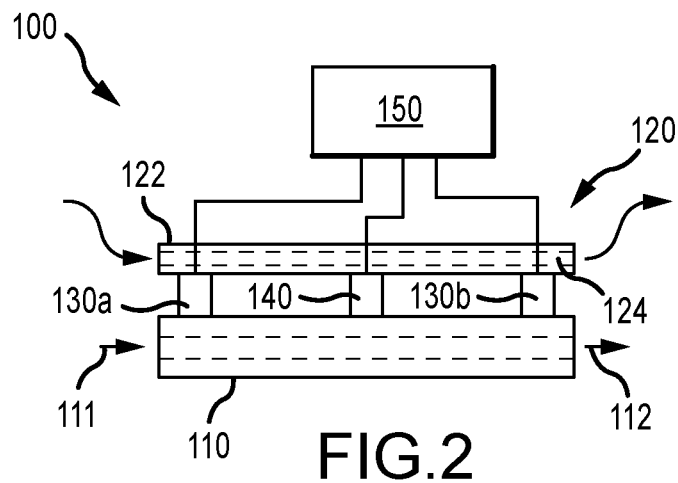
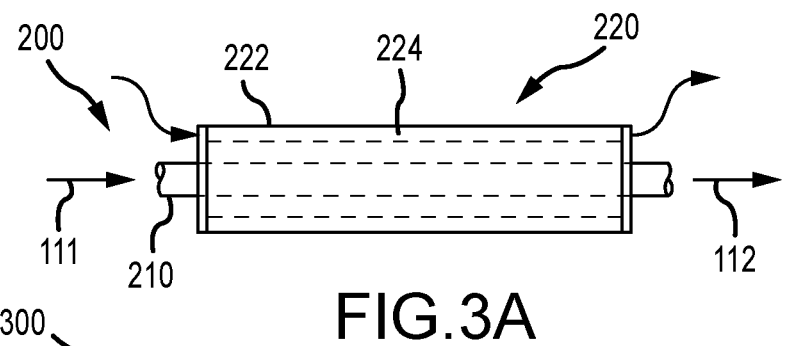
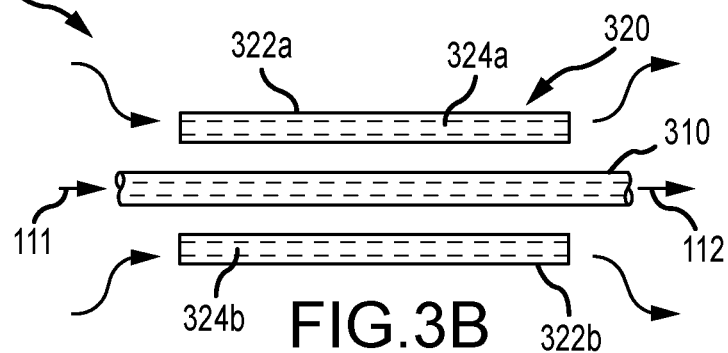
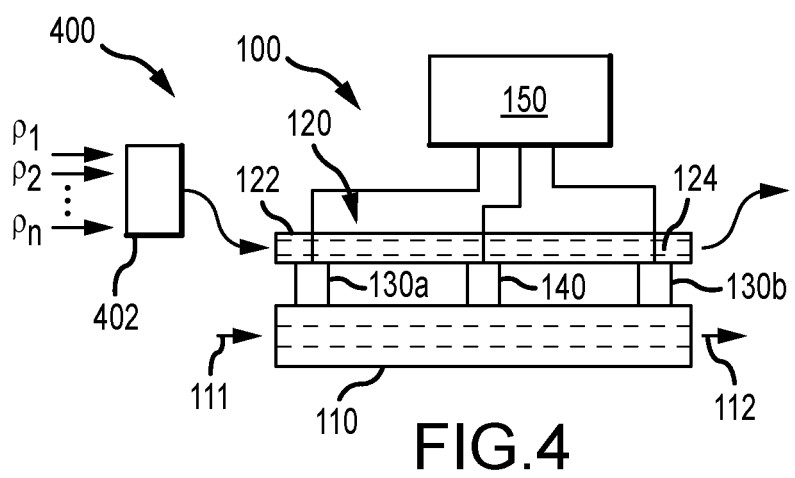

VARIABLE MASS BALANCE BAR

TECHNICAL FIELD

The embodiments described below relate to balance bars and, more particularly, to variable mass balance bars.

BACKGROUND

Vibrating sensors, such as for example, vibrating densitometers and Coriolis vibratory meters are generally known, and are used to measure mass flow and other information for materials flowing through a measuring conduit in the vibratory meter. Exemplary Coriolis vibratory meters are disclosed in U.S. Pat. Nos. 4,109,524, 4,491,025, and Re. 31,450, all to J. E. Smith et al. These vibratory meters have one or more measuring conduits of a straight or curved configuration. Each measuring conduit configuration in a Coriolis mass vibratory meter, for example, has a set of natural vibration modes, which may be of simple bending, torsional, or coupled type. Each measuring conduit can be driven to oscillate at a preferred mode.

Material flows into the vibratory meter from a connected pipeline on the inlet side of the vibratory meter, is directed through the measuring conduit(s), and exits the vibratory meter through the outlet side of the vibratory meter. The natural vibration modes of the vibrating system are defined in part by the combined mass of the measuring conduits and the material flowing within the measuring conduits.

When there is no-flow through the vibratory meter, a driving force applied to the measuring conduit(s) causes all points along the measuring conduit(s) to oscillate with identical phase or a small "zero offset", which is a time delay measured at zero flow. As material begins to flow through the vibratory meter, Coriolis forces cause each point along the measuring conduit(s) to have a different phase. For example, the phase at the inlet end of the vibratory meter lags the phase at the centralized driver position, while the phase at the outlet leads the phase at the centralized driver position. Pickoffs on the measuring conduit(s) produce sinusoidal signals representative of the motion of the measuring conduit(s). Signals output from the pickoffs are processed to determine the time delay between the pickoffs. The time delay between the two or more pickoffs is proportional to the mass flow rate of material flowing through the measuring conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the vibratory meter industry. An alternating current is passed to the drive coil for vibrating the measuring conduit(s) at a desired measuring conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage.

FIG. 1 discloses a cross section of a prior art vibratory meter 1 having a case 6 enclosing a balance bar 2 having ends 4 and measuring conduit 101. The ends of measuring conduit 101 project beyond case ends 7 and 8 of the case 6 to flanges (not shown) which enable vibratory meter 1 to be connected to a pipeline whose material flow is to be measured. A flow of the process material to be measured is illustrated by arrows 111, 112. A meter electronics 5 is connected by conductors 22, 23, and 24 to vibratory meter 1 to control its operation and to receive output signals from pickoffs (velocity sensors) LPO and RPO. The meter electronics processes the received information and transmits output information representing the material flow over conductor 26 to a utilization circuit not shown. The meter electronics 5 applies signals over conductor 23 to driver D (which has a corresponding magnet M) which in a well known manner vibrates measuring conduit 101 and balance bar 2 in phase opposition. The vibrations of measuring conduit 101 with material flow induces a Coriolis response in measuring conduit 101. The amplitude of Coriolis response is indicative of the material flow and is detected by pickoffs LPO and RPO (which have magnets M). Pickoffs LPO and RPO transmit output signals over conductors 22 and 24 to meter electronics 5 which determines the phase difference between the output signals of the two pickoffs. This phase difference is proportional to the flow rate.

However, the measuring conduit 101 of the prior art vibratory meter 1 may be balanced by the balance bar 2 for a given density of the material in the measuring conduit 101. That is, the prior art vibratory meter 1 is designed to provide accurate measurements of materials having a density that is within a range of a design density. If the density of the material is substantially greater than or less than the design density, then the measurements may be inaccurate. For example, a measurement of the density of the material may be inaccurate if the density of the material is outside a tolerance range of the design density. The design density and the corresponding tolerance range may be due to the balance bar 2 having a constant mass. Accordingly, there is a need for a variable mass balance bar.

SUMMARY

A variable mass balance bar is provided. According to an embodiment, the variable mass balance bar comprises a balance body containing a balance fluid, wherein a mass of the balance fluid is selected to balance a measuring conduit containing a process material.

A vibratory meter with a variable mass balance bar is provided. According to an embodiment, the vibratory meter comprises a measuring conduit and the variable mass balance bar mechanically coupled to the measuring conduit. A mass of the variable mass balance bar is selected to balance the measuring conduit containing a process material.

A system including a vibratory meter including a variable mass balance bar is provided. According to an embodiment, the system comprises a vibratory meter comprising a measuring conduit, and the variable mass balance bar mechanically coupled to the measuring conduit. A mass of the variable mass balance bar is selected to balance the measuring conduit containing a process material.

A method of balancing a measuring conduit with a variable mass balance bar is provided. According to an embodiment, the method comprises selecting a mass of a balance fluid to balance a measuring conduit containing a process material and providing the balance fluid to a balance body.

Aspects

According to an aspect, a variable mass balance bar (120-320, 520-820), comprises a balance body (122-322b, 522-822) containing a balance fluid (124-324b, 524-824), wherein a mass of the balance fluid (124-324b, 524-824) is selected to balance a measuring conduit (110-310, 510-810) containing a process material.

Preferably, the mass of the balance fluid (124-324*b*, 524-824) is selected by selecting a density of the balance fluid (124-324*b*, 524-824).

Preferably, a resonance frequency of the balance body (122-322*b*, 522-822) containing the balance fluid (124-324*b*, 524-824) is equal to a resonance frequency of the measuring conduit (110-310, 510-810) containing the process material.

Preferably, the mass of the balance body (122-322*b*, 522-822) is one of equal to and not equal to a mass of the measuring conduit (110-310, 510-810), and a stiffness of the balance body is one of equal to and not equal to a stiffness of the measuring conduit (110-310, 510-810).

Preferably, the balance body (122-322*b*, 522-822) is configured to be mechanically coupled to the measuring conduit (110-310, 510-810).

Preferably, the balance fluid (124-324*b*, 524-824) is a non-process material.

Preferably, the balance body (122-322*b*, 522-822) includes at least one inlet configured to receive the balance fluid (124-324*b*, 524-824) and at least one outlet configured to provide the balance fluid (124-324*b*, 524-824).

Preferably, the mass of the balance fluid (124-324*b*, 524-824) is between the at least one inlet and the at least one outlet.

According to an aspect, a vibratory meter (100-300, 500-800) with a variable mass balance bar (120-320, 520-820) comprises a measuring conduit (110-310, 510-810), and the variable mass balance bar (120-320, 520-820) mechanically coupled to the measuring conduit (110-310, 510-810). A mass of the variable mass balance bar (120-320, 520-820) is selected to balance the measuring conduit (110-310, 510-810) containing a process material.

Preferably, the mass of the variable mass balance bar (120-320, 520-820) is selected by selecting a mass of a balance fluid (124-324*b*, 524-824) of the variable mass balance bar (120-320, 520-820).

Preferably, a resonance frequency of the variable mass balance bar (120-320, 520-820) is equal to a resonance frequency of the measuring conduit (110-310, 510-810) containing the process material.

Preferably, the mass of the variable mass balance bar (120-320, 520-820) is one of equal to and not equal to a mass of the measuring conduit (110-310, 510-810) containing the process material, and a stiffness of the variable mass balance bar (120-320, 520-820) is one of equal to and not equal to a stiffness of the measuring conduit (110-310, 510-810).

Preferably, the variable mass balance bar (120-320, 520-820) includes at least one inlet and at least one outlet, wherein the mass of the variable mass balance bar (120-320, 520-820) is between the inlet and the outlet.

Preferably, the mass of the variable mass balance bar (120-320, 520-820) is selected by selecting a density of the variable mass balance bar (120-320, 520-820).

Preferably, the vibratory meter (700, 800) further comprises at least one balance sensor (780, 880) mechanically coupled to the variable mass balance bar (720, 820) and a reference structure (760, 860*b*) of the vibratory meter (700, 800).

Preferably, the vibratory meter (700, 800) further comprises a meter electronics (750, 850) communicatively coupled to the at least one balance sensor (780, 880), the meter electronics (750, 850) being configured to determine if the variable mass balance bar (720, 820) balances the measuring conduit (710, 810) containing the process material.

Preferably, the meter electronics (750, 850) being configured to determine if the variable mass balance bar (720, 820) balances the measuring conduit (710, 810) containing the process material comprises the meter electronics (750, 850) being configured to determine if a resonance frequency of the measuring conduit (710, 810) containing the process material is equal to a resonance frequency of the variable mass balance bar (720, 820).

According to an aspect, a system (400, 900) including a vibratory meter (100') including a variable mass balance bar (120) comprises a vibratory meter (100, 100') comprising a measuring conduit (110), and the variable mass balance bar (120) mechanically coupled to the measuring conduit (110), wherein a mass of the variable mass balance bar (120) is selected to balance the measuring conduit (110) containing a process material.

Preferably, the mass of the variable mass balance bar (120) is selected by selecting a mass of a balance fluid (124) of the variable mass balance bar (120).

Preferably, a resonance frequency of the variable mass balance bar (120) is equal to a resonance frequency of the measuring conduit (110) containing the process material.

Preferably, the mass of the variable mass balance bar (120) is one of equal to and not equal to a mass of the measuring conduit (110) containing the process material, and a stiffness of the variable mass balance bar (120) is one of equal to and not equal to a stiffness of the measuring conduit (110).

Preferably, the variable mass balance bar (120) includes at least one inlet and at least one outlet, wherein the mass of the variable mass balance bar (120) is between the inlet and the outlet.

Preferably, the mass of the variable mass balance bar (120) is selected by selecting a density of the variable mass balance bar (120).

Preferably, the system (400, 900) further comprises at least one balance sensor (980) mechanically coupled to the variable mass balance bar (120) and a reference structure (160, 160*a*, 160*b*).

Preferably, the system (900) further comprises a meter electronics (150) communicatively coupled to the at least one balance sensor (980), the meter electronics (150) being configured to at least one of determine if the variable mass balance bar (120) balances the measuring conduit (110) containing the process material and select a mass of the variable mass balance bar (120).

Preferably, the meter electronics (150) being configured to determine if the variable mass balance bar (120) balances the measuring conduit (110) containing the process material comprises the meter electronics (150) being configured to determine if a resonance frequency of the measuring conduit (110) containing the process material is equal to a resonance frequency of the variable mass balance bar (120).

Preferably, the meter electronics (150) being configured to select the mass of the variable mass balance bar (120) comprises the meter electronics (150) being configured to select the mass of the balance fluid (124) of the variable mass balance bar (120) by at least one of controlling a density of the balance fluid (124), and controlling a volume of the balance fluid (124) of the variable mass balance bar (120).

Preferably, the system (900) further comprises an accelerometer (990) coupled to the reference structure (160, 160*a*, 160*b*) and communicatively coupled to the meter electronics (150), wherein the accelerometer (990) is configured to sense a vibration of the reference structure (160, 160*a*, 160*b*).

Preferably, the meter electronics (150) being configured to determine if the variable mass balance bar (120) balances the measuring conduit (110) comprises the meter electronics (150) being configured to determine if the reference structure (160, 160a, 160b) of the vibratory meter (100) is vibrating due to the variable mass balance bar (120) not balancing the measuring conduit (110) containing the process material.

Preferably, the system (400, 900) further comprises a mixer (402, 902) fluidly coupled to the variable mass balance bar (120), the mixer (402, 902) being configured to mix a plurality of balance fluid components into the balance fluid (124), and provide the balance fluid (124) to the variable mass balance bar (120).

According to an aspect, a method of balancing a measuring conduit with a variable mass balance bar comprises selecting a mass of a balance fluid to balance a measuring conduit containing a process material and providing the balance fluid to a balance body.

Preferably, selecting the mass of the balance fluid to balance the measuring conduit containing the process material comprises selecting a density of the balance fluid.

Preferably, a resonance frequency of the balance body containing the balance fluid is equal to a resonance frequency of the measuring conduit containing the process material.

Preferably, the mass of the balance body is one of equal to and not equal to a mass of the measuring conduit, and a stiffness of the balance body is one of equal to and not equal to a stiffness of the measuring conduit.

Preferably, the method further comprises configuring the balance body to be mechanically coupled to the measuring conduit.

Preferably, the balance fluid is a non-process material.

Preferably, providing the balance fluid to the balance body comprises providing the balance fluid to at least one inlet configured to receive the balance fluid.

Preferably, the method further comprises coupling at least one balance sensor to the variable mass balance bar and a reference structure of a vibratory meter.

Preferably, the method further comprises using the balance sensor to determine if the variable mass balance bar balances the measuring conduit containing the process material.

Preferably, using the balance sensor to determine if the variable mass balance bar balances the measuring conduit containing the process material comprises using the balance sensor to determine if a resonance frequency of the measuring conduit is equal to a resonance frequency of the variable mass balance bar.

Preferably, the method further comprises coupling an accelerometer to the reference structure and sensing a vibration of the reference structure with the accelerometer.

Preferably, the method further comprises determining if the reference structure is vibrating due to the variable mass balance bar not balancing the measuring conduit containing the process material.

Preferably, the providing the balance fluid to the balance body comprises mixing a plurality of balance fluid components into the balance fluid and providing the balance fluid to the balance body.

BRIEF DESCRIPTION OF THE DRAWINGS

The same reference number represents the same element on all drawings. It should be understood that the drawings are not necessarily to scale.

FIG. 2 shows a vibratory meter 100 including a variable mass balance bar 120.

FIGS. 3A and 3B show alternative variable mass balance bars in vibratory meters that do not, for clarity, depict meter electronics or pickoff sensors.

FIG. 4 shows a system 400 with the vibratory meter 100 including the variable mass balance bar 120.

DETAILED DESCRIPTION

Figure 1:
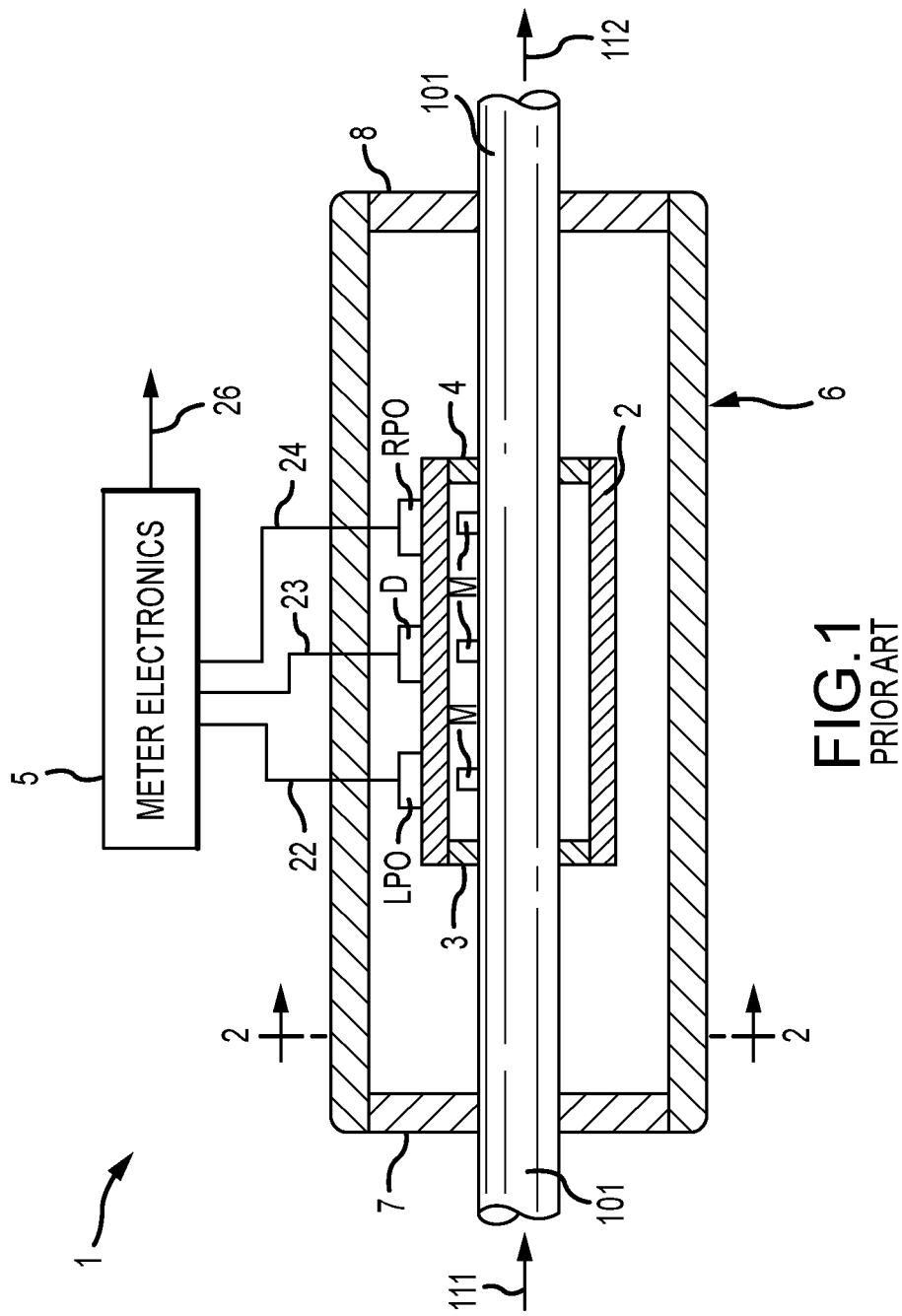
FIG. 1 discloses a cross section of a prior art vibratory meter 1 having a case 6 enclosing a balance bar 2 and measuring conduit 101.

FIGS. 1-10 and the following description depict specific examples to teach those skilled in the art how to make and use the best mode of embodiments of a variable mass balance bar. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the variable mass balance bar. As a result, the embodiments described below are not limited to the specific examples described below, but only by the claims and their equivalents.

Vibratory Meters

FIG. 2 shows a vibratory meter 100 including a variable mass balance bar 120. As shown in FIG. 2, the variable mass balance bar 120 is adjacent to a measuring conduit 110, which is shown as having a different size than the measuring conduit 101 shown in FIG. 1. Although not shown in FIG. 2, ends of the measuring conduit 110 and the variable mass balance bar 120 may be rigidly coupled together with a coupler, which may in turn be coupled to a case, which are not shown for clarity. As shown in FIG. 2, a flow of the process material to be measured by the measuring conduit 110 is illustrated by arrows 111, 112.

A left pickoff sensor 130a, a right pickoff sensor 130b, and a driver 140 are disposed between and coupled to the measuring conduit 110 and the variable mass balance bar 120. The left pickoff sensor 130a, the right pickoff sensor 130b, and the driver 140 are shown as being communicatively coupled to a meter electronics 150. As will be described in more detail below, the meter electronics 150 may provide a drive signal to the driver 140 and receive sensor signals from the left pickoff sensor 130a and the right pickoff sensor 130b to measure properties of the material in the measuring conduit 110, such as density, mass flow rates, or the like. As will also be described in more detail in the below with reference to FIG. 9, the meter electronics 150 may be communicatively coupled to other devices.

As shown in FIG. 2, the measuring conduit 110 is a straight cylindrical tube, although any suitable shape may be employed. For example, alternative measuring conduits may be bow shaped, curved, or the like. The measuring conduit 110 is shown as having an outer diameter. As illustrated with dashed lines, the measuring conduit 110 also has an inner diameter. The measuring conduit 110 is configured to oscillate when subjected to a vibratory force provided by, for example, the driver 140. The vibration oscillates at a resonance frequency and is balanced by the variable mass balance bar 120.

The variable mass balance bar 120 has a mass that can be selected to balance the measuring conduit 110. For example, a density of the variable mass balance bar 120 may be selected to balance the measuring conduit 110. The variable mass balance bar 120 includes a balance body 122. As shown in FIG. 2, the balance body 122 has a shape of a straight cylindrical tube having a wall thickness defined by a cylindrical inner surface. The balance body 122 may be comprised of materials and/or have a shape the same as, similar to, or different than the measuring conduit 110. As shown in FIG. 2, the balance body 122 has approximately the same length as the measuring conduit 110 and has an outer diameter that is smaller than an outer diameter of the measuring conduit 110. The balance body 122 also includes an inner diameter (illustrated by dashed lines) of a cylindrical inner surface that extends along the length of the variable mass balance bar 120.

The variable mass balance bar 120 also includes a balance fluid 124. The balance fluid 124 is shown with arrows as entering and exiting the variable mass balance bar 120. More specifically, the balance fluid 124 is shown as entering the balance body 122 at an inlet proximate an inlet arrow, being conveyed by the balance body 122, and provided by the balance body 122 at an outlet proximate an outlet arrow. Accordingly, the balance fluid 124 may fill a space formed by the cylindrical inner surface of the balance body 122. The balance fluid 124 has properties that may ensure the variable mass balance bar 120 balances the measuring conduit 110. As a result, a measurement of a property of the process material in the measuring conduit 110 may be accurate even though the density of the process material may vary.

Although the variable mass balance bar 120 shown in FIG. 2 is a single straight cylindrical tube disposed adjacent to the measuring conduit 110, alternative shapes and/or configurations may be employed. For example, other variable mass balance bars may be comprised of two or more variable mass balance bars disposed around a measuring tube, one or more variable mass balance bars that partially or fully surround the measuring tube, or the like. Additionally, or alternatively, the other variable mass balance bars may have cross-sectional shapes that are not circular, such as elliptical, triangular, square, or the like. The other variable mass balance bars may also have different geometries, such as bowed, curved, U-shaped, or the like, geometries. Some exemplary alternative configurations are discussed in the following with reference to FIGS. 3A and 3B.

Variable Mass Balance Bars

FIGS. 3A and 3B show alternative variable mass balance bars in vibratory meters that do not, for clarity, depict meter electronics or pickoff sensors. FIG. 3A shows a first alternative vibratory meter 200 comprising a measuring conduit 210 disposed within and surrounded by a cylindrical variable mass balance bar 220. The cylindrical variable mass balance bar 220 is comprised of a cylindrical balance body 222 and a balance fluid 224 contained within the cylindrical balance body 222. The balance fluid 224 is shown as entering the cylindrical balance body 222 at an inlet proximate an inlet arrow, being conveyed by the cylindrical balance body 222, and provided by the cylindrical balance body 222 at an outlet proximate an outlet arrow.

FIG. 3B shows a second alternative vibratory meter 300 comprising a measuring conduit 310 disposed within a dual variable mass balance bar 320. The dual variable mass balance bar 320 is comprised of a first half variable mass balance bar 320a and a second half variable mass balance bar 320b. The first half variable mass balance bar 320a is comprised of a first half balance body 322a and a first half balance fluid 324a. The second half variable mass balance bar 320b is comprised of a second half balance body 322b and a second half balance fluid 324b. The balance fluid is therefore comprised of the first and second half balance fluids 324a, 324b respectively contained within the first and second half balance bodies 322a, 322b. The first and second half balance fluids 324a, 324b are shown as respectively entering the first and second half balance bodies 322a, 322b at inlets proximate an inlet arrow, being conveyed by the first and second half balance bodies 322a, 322b, and provided by the first and second half balance bodies 322a, 322b at outlets proximate an outlet arrow.

Variable Mass Balance Bars

The variable mass balance bars, such as, the variable mass balance bars 120, 220, 320 described above, may include an inlet and an outlet. For example, in the above FIGS. 2-3B, the variable mass balance bars 120, 220, 320 receive their respective balance fluids 124, 224, 324a, 324b at inlets proximate the arrows 111. The received balance fluids 124, 224, 324a, 324b are conveyed by the balance bodies 122, 222, 322a, 322b to outlets that are proximate the arrows 112. The balance fluid 124, 224, 324a, 324b is contained by the respective inner surfaces of the balance bodies 122, 222, 322a, 322b. As can be appreciated, the inlets and outlets of the variable mass balance bars 120, 220, 320 are at ends of the variable mass balance bars 120, 220, 320 and the balance bodies 122, 222, 322a, 322b.

The ends of the variable mass balance bars may be coupled to the ends of the measuring conduits. For example, with reference to FIGS. 2-3B, the ends of the variable mass balance bars 120, 220, 320 may be coupled to the ends of the measuring conduits 110, 210, 310 with couplers. The couplers may define vibration nodes of the variable mass balance bars and the measuring conduits. Accordingly, the ends of the variable mass balance bars and the measuring conduits may be vibration nodes.

The mass of the variable mass balance bar, such as the variable mass balance bars 120, 220, 320 described above, may be the portion of the variable mass balance bar between the ends of the variable mass balance bars. The mass may, for example, be between nodes defined by the couplers coupled to the ends of the variable mass balance bar and the measuring conduit. Exemplary couplers are described below with reference to FIG. 5. As can be appreciated, the mass is determined by the mass of the balance fluid 124-324b between the ends of the variable mass balance bars 120, 220, 320.

Balance Fluid

The balance fluid, such as the balance fluids 124, 224, 324a, 324b described above, may be comprised of the process material or a non-process material. The non-process material may be advantageous where, for example, the process material is perishable. Additionally, the non-process material may have densities that are not the same as the process material, thereby allowing the variable mass balance bar to balance the conduit, even though the balance body of the variable mass balance bar is not the same as the measuring conduit. Additionally, or alternatively, the density of the non-process material may be varied to ensure that the variable mass balance bar balances the conduit with the process material even though the density of the process material may vary.

Accordingly, properties of the balance fluid may be known or selected for balancing the measuring conduit containing the process material before being used in a vibratory meter. That is, the balance fluid may not be a process material to be measured by the vibratory meter and therefore the vibratory meter is not inherently balanced due to the same process material being distributed at the same process conditions between two similarly dimensioned conduits. Nevertheless, for example, a density of the balance fluid may be known or controlled to ensure that a variable mass balance bar balances the measuring conduit.

As will be explained below in more detail, the balance fluid may have a density that is the same as, greater than, or less than a density of the process material contained by the measuring conduit. The balance fluid may be considered part of the vibratory meter whereas the process material to be measured by the vibratory meter may not be considered a part of the vibratory meter. For example, the vibratory meter or variable mass balance bar may be sold to a customer with the balance fluid already contained. Alternatively, the customer may select and configure the balance fluid. Accordingly, in this example, the balance fluid may not be a part of the vibratory meter or variable mass balance bar.

The balance fluid may have a density that is selected. For example, the balance fluid may be comprised of a known fluid having a corresponding known density. The fluid may be selected thereby selecting the density. Alternatively, balance fluid components having corresponding component densities may be mixed together to select the density of the balance fluid. One or more of the balance fluid components may be a fluid, a non-fluid, such as a solid, gas, and/or the like.

Balanced Vibratory Meter

The variable mass balance bars and the measuring conduits containing a process material, such as the variable mass balance bars 120, 220, 320 and the measuring conduits 110, 210, 310 described above, may be balanced if their respective resonance frequencies are equal. The resonance frequencies may be equal if the relationship of below equation [3] is satisfied. To explain equation [3], we begin by noting that a measuring conduit containing a process material may behave according to equation [1]:

$$2\pi f_{process} = \sqrt{\frac{k_1}{m_{cond} + m_{process\ material}}}, \quad [1]$$

where:
$f_{process}$ is a resonance frequency of the measuring conduit containing the process material;
$m_{cond}$ is a mass of the measuring conduit;
$m_{process\ material}$ is a mass of the process material contained by the measuring conduit; and
$k_1$ is a spring constant of the measuring conduit containing the process material.

Similarly, the variable mass balance bar comprising the balance body containing the balance fluid may behave according to below equation [2]:

$$2\pi f_{balance} = \sqrt{\frac{k_2}{m_{balance} + m_{balfluid}}}, \quad [2]$$

where:
$f_{balance}$ is a resonance frequency of the variable mass balance bar, comprising the balance body containing the balance fluid;
$m_{balance}$ is a mass of the balance body;
$m_{balfluid}$ fluid is a mass of the balance fluid contained by the balance body; and
$k_2$ is a spring constant of the balance body containing the balance fluid.

For the variable mass balance bar to balance the measuring conduit, the resonance frequency $f_{process}$ of the measuring conduit containing the process material may be equal to the resonance frequency $f_{balance}$ of the variable mass balance bar comprising the balance body and the balance fluid: $f_{process} = f_{balance}$. It follows from above equations [1] and [2] that the following equation [3] may be met:

$$\frac{k_1}{m_{cond} + m_{process\ material}} = \frac{k_2}{m_{balance} + m_{balfluid}}, \quad [3]$$

for the variable mass balance bar to balance the measuring conduit containing the process material.

The spring constants and mass of the measuring conduit and the balance body may be determined and established by a design of a vibratory meter, such as the vibratory meters 100, 200, 300 described above with reference to FIGS. 2-3B. For example, geometries, dimensions, and materials of the measuring conduit and the balance body may be chosen such that the spring constants have desired values. In one example, the measuring conduit and the balance body may have a cylindrical shape having lengths, inner diameter, outer diameter, and material selected to obtain desired masses and spring constants of the measuring conduit and the balance body.

As can be appreciated from equation [3], the variable mass balance bar may balance the measuring conduit containing the process material if the spring constant of the measuring conduit is equal to, or not equal to, the spring constant of the balance body containing the balance fluid. For example, if the spring constant of the measuring conduit is not equal to the spring constant of the balance body, then the mass of the measuring conduit, the balance body, the process material, and/or the balance fluid may differ to ensure that equation [3] is met by the design.

Still referring to equation [3], the spring constants and the masses of the measuring conduit and the balance body may be determined during a design of a vibratory meter. Additionally, the mass of the process material may sufficiently vary such that the vibratory meter is no longer balanced. That is, the vibratory meter may not conform to equation [3] due to variation in the mass of the process material. However, by varying the mass of the balance fluid, conformity to equation [3] may be achieved. For example, should a mass of the process material increase significantly due to an increase in a density of the process material, then correspondingly increasing a density of the balance fluid may ensure that the vibratory meter still complies with equation [3].

Accordingly, variable mass balance bar, such as the variable mass balance bars 120, 220, 320 described above, may comprise a balance body containing a balance fluid, wherein a mass of the balance fluid is selected to balance a measuring conduit containing a process material. The mass of the balance fluid may be selected by selecting a density of the balance fluid. Accordingly, a resonance frequency of the balance body containing the balance fluid may be equal to a resonance frequency of the measuring conduit containing a process material.

The resonance frequencies may be equal in various configurations of the balance body and balance fluid. For example, the mass of the balance body may be equal to or not equal to a mass of the measuring conduit. Additionally, or alternatively, a stiffness of the balance body may be equal to or not equal to a stiffness of the measuring conduit. The balance body may be configured to be mechanically coupled to the measuring conduit. Also, the balance fluid may be a non-process material. Although the balance fluid may be fully contained (e.g., ends of balance body sealed), it may be preferable to control properties of the balance fluid, such as a temperature, by flowing the balance fluid. Accordingly, the balance body may include at least one inlet configured to receive the balance fluid and at least one outlet configured to provide the balance fluid. The mass of the balance fluid may therefore be the mass of the balance fluid between the inlet and the outlet.

As can be appreciated, the mass of the variable mass balance bar may be controlled by controlling properties of the balance fluid. For example, as discussed above, the density of the balance fluid may be selected. To control the mass, the density of the balance fluid, after being selected, may be controlled by, for example, controlling other properties of the balance fluid, such as a composition, temperature, or the like, of the balance fluid. Controlling the properties of the balance fluid may be manual, such as simply selecting an appropriate fluid having the selected density. However, the mass of the balance fluid may be controlled automatically. An exemplary system for automatically controlling the density of the balance fluid, and thereby controlling the mass of the variable mass balance bar, is described in the following with reference to FIG. 4.

Controlling a Mass of a Variable Mass Balance Bar

FIG. 4 shows a system 400 with the vibratory meter 100 including the variable mass balance bar 120. As with FIG. 2, the vibratory meter 100 shown in FIG. 4 includes the variable mass balance bar 120. As shown in FIG. 4, the measuring conduit 110 is adjacent to the variable mass balance bar 120. Although not shown in FIG. 4, ends of the measuring conduit 110 and the variable mass balance bar 120 may be rigidly coupled together with a coupler, which may in turn be coupled to a case, which are not shown for clarity. A flow of the process material to be measured by the measuring conduit 110 is illustrated by arrows 111, 112.

The left pickoff sensor 130a, the right pickoff sensor 130b, and the driver 140 are disposed between and coupled to the measuring conduit 110 and the variable mass balance bar 120. The left pickoff sensor 130a, the right pickoff sensor 130b, and the driver 140 are shown as being communicatively coupled to a meter electronics 150. As will be described in more detail below, the meter electronics 150 may provide a drive signal to the driver 140 and receive sensor signals from the left pickoff sensor 130a and the right pickoff sensor 130b to measure properties of the material in the measuring conduit 110, such as density, mass flow rates, or the like.

As shown in FIG. 4, the meter electronics 150 is communicatively coupled to a mixer 402. The mixer 402 is shown as receiving a plurality of balance fluid components, each having a corresponding component density $\rho_1, \rho_2, \ldots \rho_n$. The mixer 402 may receive the plurality of balance fluid components, mix the plurality of balance fluid components into the balance fluid 124, and provide the balance fluid 124 to the balance body 122. The mixer 402 may also be configured to condition the balance fluid 124. For example, the mixer 402 may heat and/or cool the balance fluid 124. Although the mixer 402 is shown as a single integrated device, it may be comprised of distinct sub-devices, where each sub-device has a control circuit. As shown in FIG. 4, the mixer 402 may include a control circuit that can control the mass of the balance fluid 124 by controlling a density of the balance fluid 124, as is described in more detail in the following.

The mixer 402 is shown as being comprised of a plurality of inlets, each of which is fluidly coupled to a corresponding balance fluid component. The mixer 402 may also include valves, such as flow rate valves, that regulate flow rates of a corresponding balance fluid component. The mixer 402 may also select one of, or mix two or more of, the plurality of balance fluid components into the balance fluid 124. For example, the mixer 402 may include a control circuit with a memory that stores the component densities $\rho_1, \rho_2, \ldots \rho_n$ of the plurality of balance fluid components. The control circuit may store and/or receive other values, such as a volume of the measuring conduit 110, a density of the process material in the measuring conduit 110, a volume of the balance body 120, or the like.

Accordingly, the mixer could operate without a feedback from the meter electronics 150 if, for example, the density of the process material in the measuring conduit 110 is known along with the volume of the measuring conduit 110. The dosing of any balance fluid component to balance the measuring conduit 110 could then be approximated, assuming substantially equal stiffness, as:

$$(\rho_{process\ fluid})(V_{process\ fluid}) = [\Sigma_{i=1}^{n}(x_i)(\rho_i)](V_{balance\ structure}) \quad [4]$$

where:
   i is an index of a balance fluid component;
   n is a total number of the balance fluid components;
   $x_i$ is the mass fraction of one of the balance fluid components; and
   $\rho$ is the density of the balance fluid component.

The above equation may assume there is no reaction between any of the balance fluid components that would change the composition and density of the balance fluid 124.

The mixer 402 may include a density meter that measures a density of the balance fluid components and/or the balance fluid 124 provided to the balance body 122. The measured densities may be used to adjust the density of the balance fluid 124 provided to the balance body 122. For example, referring to the above equation [4], the density of the balance fluid 124 may be equal to the $\Sigma_{i=1}^{n}(x_i)(\rho_i)$ term. Accordingly, the control circuit in the mixer 402 may adjust (e.g., increase or decrease) a mass fraction $x_i$ of one or more of the balance fluid components so the measured density results in the balance fluid 124 meeting the requirements of equation [4].

The mixer 402 may be used to provide the balance fluid 124 so that the variable mass balance bar 120 balances the measuring conduit 110 containing the process material without controlling a volume of the balance fluid 124. For example, the system 400 may balance the measuring conduit 110 without controlling a flow rate of the balance fluid 124 provided to the balance body 122. However, other systems may control a volume of a balance fluid in a balance body. To control the flow of the balance fluid to the exemplary systems, valves may be employed, such as those described below with reference to FIG. 5.

Controlling a Volume of a Balance Fluid

Figure 5:
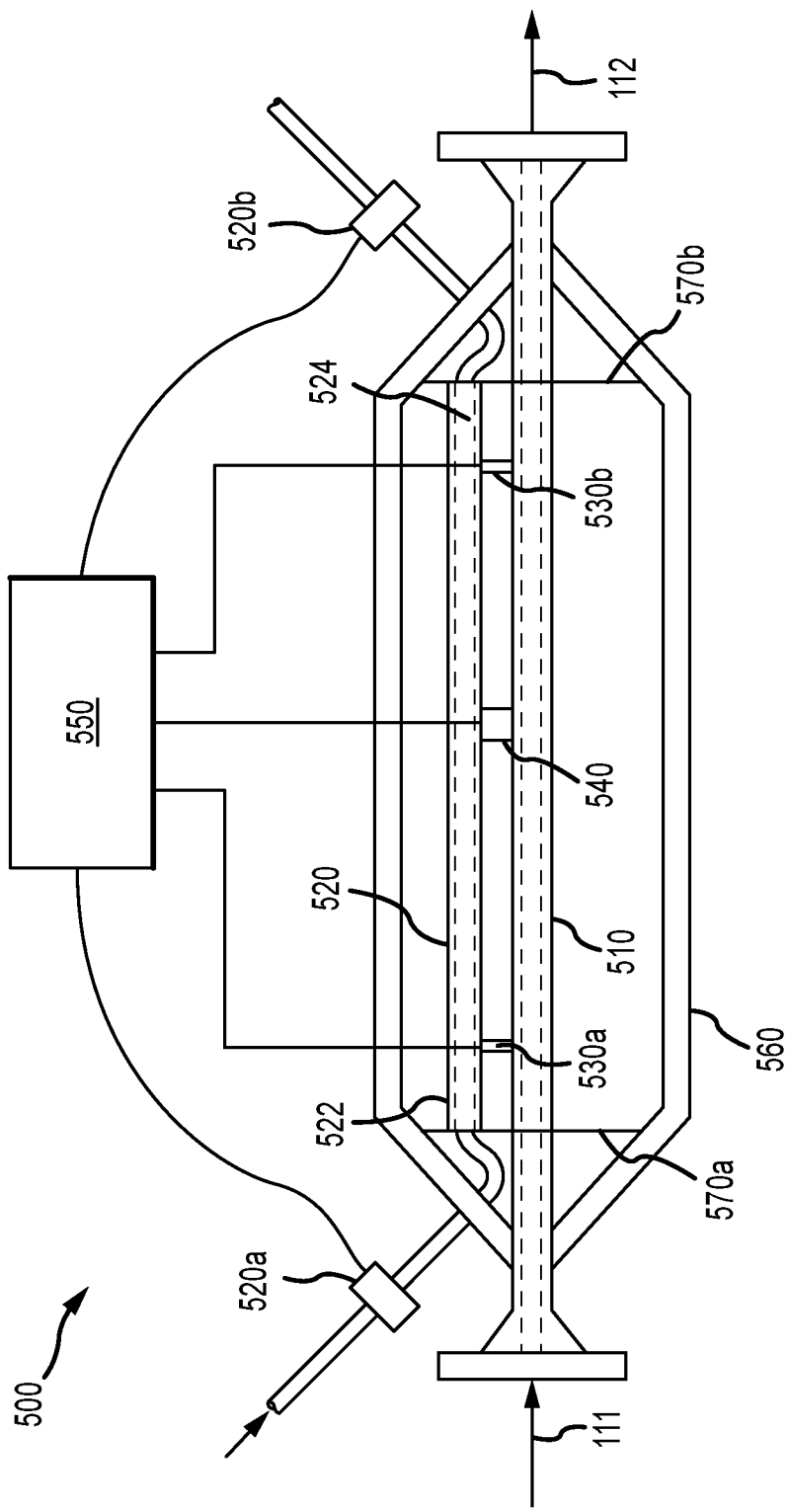
FIG. 5 shows a vibratory meter 500 including a variable mass balance bar 520.

FIG. 5 shows a vibratory meter 500 including a variable mass balance bar 520. As shown in FIG. 5, the vibratory meter 500 includes a measuring conduit 510. The variable mass balance bar 520 is adjacent to a measuring conduit 510, which may be the same as or different than the measuring conduit 510 shown in FIG. 1. As shown in FIG. 5, ends of the measuring conduit 510 and the variable mass balance bar 520 may be coupled together with, for example, a first coupler 570a and a second coupler 570b. The first and second couplers 570a, 570b are also coupled to a case 560.

A left pickoff sensor 530a, a right pickoff sensor 530b, and a driver 540 are disposed between and coupled to the measuring conduit 510 and the variable mass balance bar 520. The left pickoff sensor 530a, the right pickoff sensor 530b, and the driver 540 are shown as being communicatively coupled to a meter electronics 550. As will be described in more detail below, the meter electronics 550 may provide a drive signal to the driver 540 and receive sensor signals from the left pickoff sensor 530a and the right pickoff sensor 530b to measure properties of the process material in the measuring conduit 510, such as density, mass flow rates, or the like. The meter electronics 550 may also be communicatively coupled to other devices, such as a mixer, like the mixer 402 described above.

As shown in FIG. 5, the meter electronics 550 is also communicatively coupled to an inlet valve 520a and an outlet valve 520b. The inlet valve 520a is fluidly coupled to the inlet of the variable mass balance bar 520. The inlet valve 520a is configured to receive the balance fluid 524 from a source, such as a mixer, and control a flow rate, such as a volume or mass flow rate, of the balance fluid 524 provided to the balance body 522. The outlet valve 520b is fluidly coupled to the outlet of the variable mass balance bar 520. The outlet valve 520b is configured to receive the balance fluid 524 from the balance body 522 and control the flow rate of the balance fluid 524 leaving the balance body 522. Accordingly, the mass of the balance fluid 524 in the balance body 522 may be controlled. For example, by controlling the flow rate of the balance fluid 524 into and out of the balance body 522, a temperature and/or volume of the balance fluid 524 may be controlled.

The foregoing discloses variable mass balance bars for balancing measuring conduits with a straight tube configuration. In addition, the vibratory meter 500 included the inlet valve 520a and the outlet valve 520b. Other configurations may be employed that use alternative measuring conduit geometries and more or fewer balance fluid valves. An exemplary vibratory meter having an alternative configuration is described below with reference FIGS. 6A and 6B.

Figure 6A:
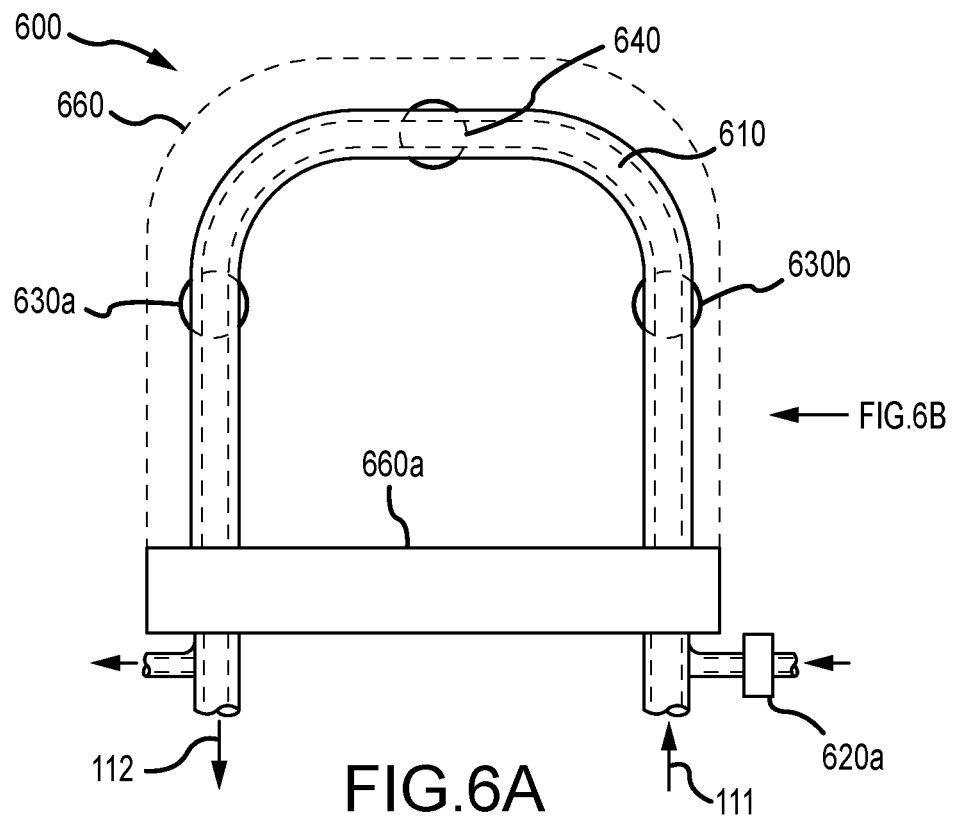
FIGS. 6A and 6B show a vibratory meter 600 with a variable mass balance bar 620.
Figure 6B:
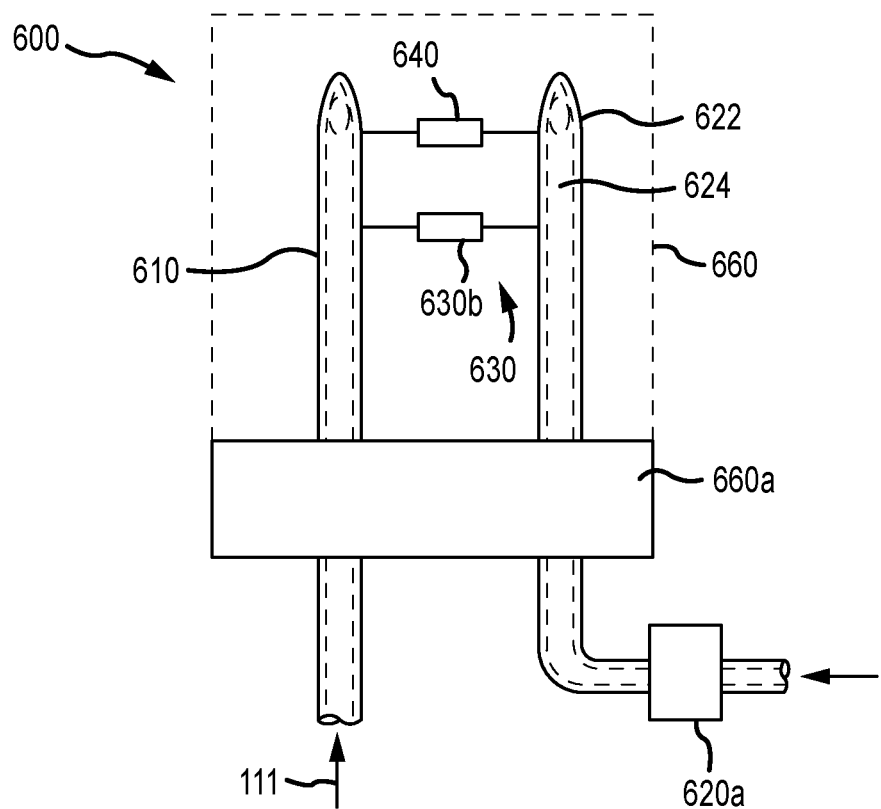

FIGS. 6A and 6B show a vibratory meter 600 with a variable mass balance bar 620. As shown in FIGS. 6A and 6B, the vibratory meter 600 includes a measuring conduit 610. As shown in FIG. 6B, the measuring conduit 610 is disposed adjacent to the variable mass balance bar 620. The variable mass balance bar 620 is comprised of a balance body 622 and a balance fluid 624. The vibratory meter 600 is shown as including pickoff sensors 630 that are disposed between, and coupled to, the measuring conduit 610 and the variable mass balance bar 620. The pickoff sensors 630 are comprised of a left pickoff sensor 630a and a right pickoff sensor 630b. The vibratory meter 600 also includes a driver 640 disposed between, and coupled to, the measuring conduit 610 and the variable mass balance bar 620.

As shown in FIGS. 6A and 6B, the vibratory meter 600 includes an inlet valve 620a. The vibratory meter 600 does not include an outlet valve. The inlet valve 620a is fluidly coupled to the inlet of the variable mass balance bar 620. The inlet valve 620a may be configured to receive the balance fluid 624 from a source, such as a mixer, and control a flow rate, such as a volume or mass flow rate, of the balance fluid 624 provided to the balance body 622. Accordingly, the mass of the balance fluid 624 in the balance body 622 may be controlled. For example, by controlling the flow rate of the balance fluid 624 into the balance body 622, a temperature and/or volume of the balance fluid 624 may be controlled.

Also as shown in FIGS. 6A and 6B, the vibratory meter 600 includes a case 660. The case 660 is mechanically coupled to a base 660a. The measuring conduit 610 extends through the base 660a into a space formed by the case 660. The case 660 and base 660a may be a substantially rigid structure. The base 660a may therefore be coincident with vibration nodes of the measuring conduit 610 and the variable mass balance bar 620. In addition, the case 660 and the base 660a may be reference structures or surfaces. For example, surfaces on the case 660 and/or base 660a may be assumed to have zero displacement with respect to time when the measuring conduit 610 and/or variable mass balance bar 620 vibrate. Accordingly, a displacement of the measuring conduit 610 and/or variable mass balance bar 620 may be measured relative to the reference surface or reference structure, which may be the case 660, as will be discussed with reference to FIGS. 7 and 8.

As discussed above with reference to FIGS. 5, 6A, 6B, a mixer may be used to provide the balance fluid 524, 624 so that the variable mass balance bar 520, 620 balances the measuring conduit 510, 610 containing the process material without determining whether the measuring conduit 510, 610 is balanced. However, vibratory meters or systems employing the vibratory meters may also determine if a balance fluid balances a measuring conduit containing the process material. Exemplary systems and vibratory meters are discussed below with reference to FIGS. 7 and 8.

Determining if a Balance Fluid Balances a Measuring Conduit

Figure 7:
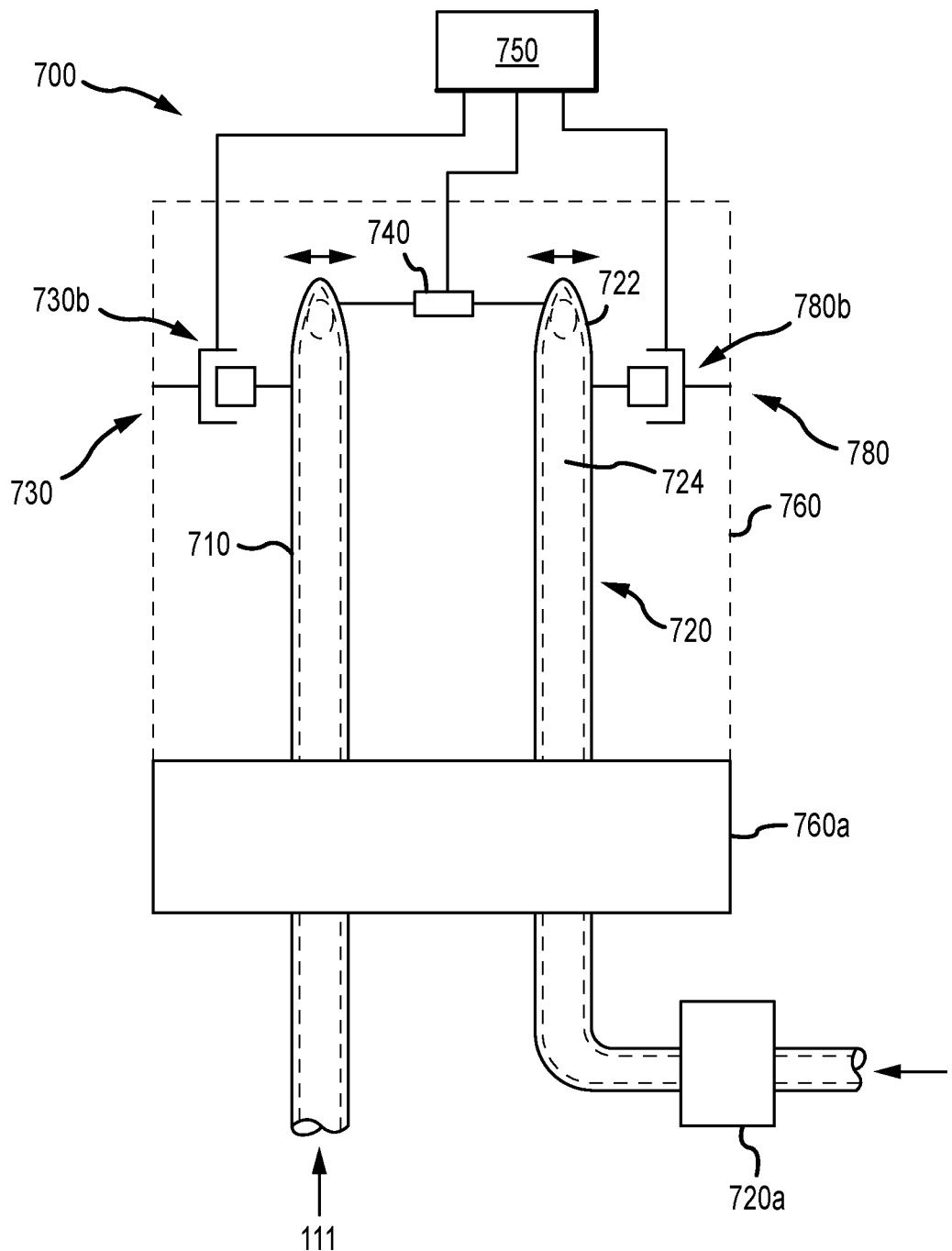
FIGS. 7 and 8 show vibratory meters including variable mass balance bars and balance sensors.
Figure 8:
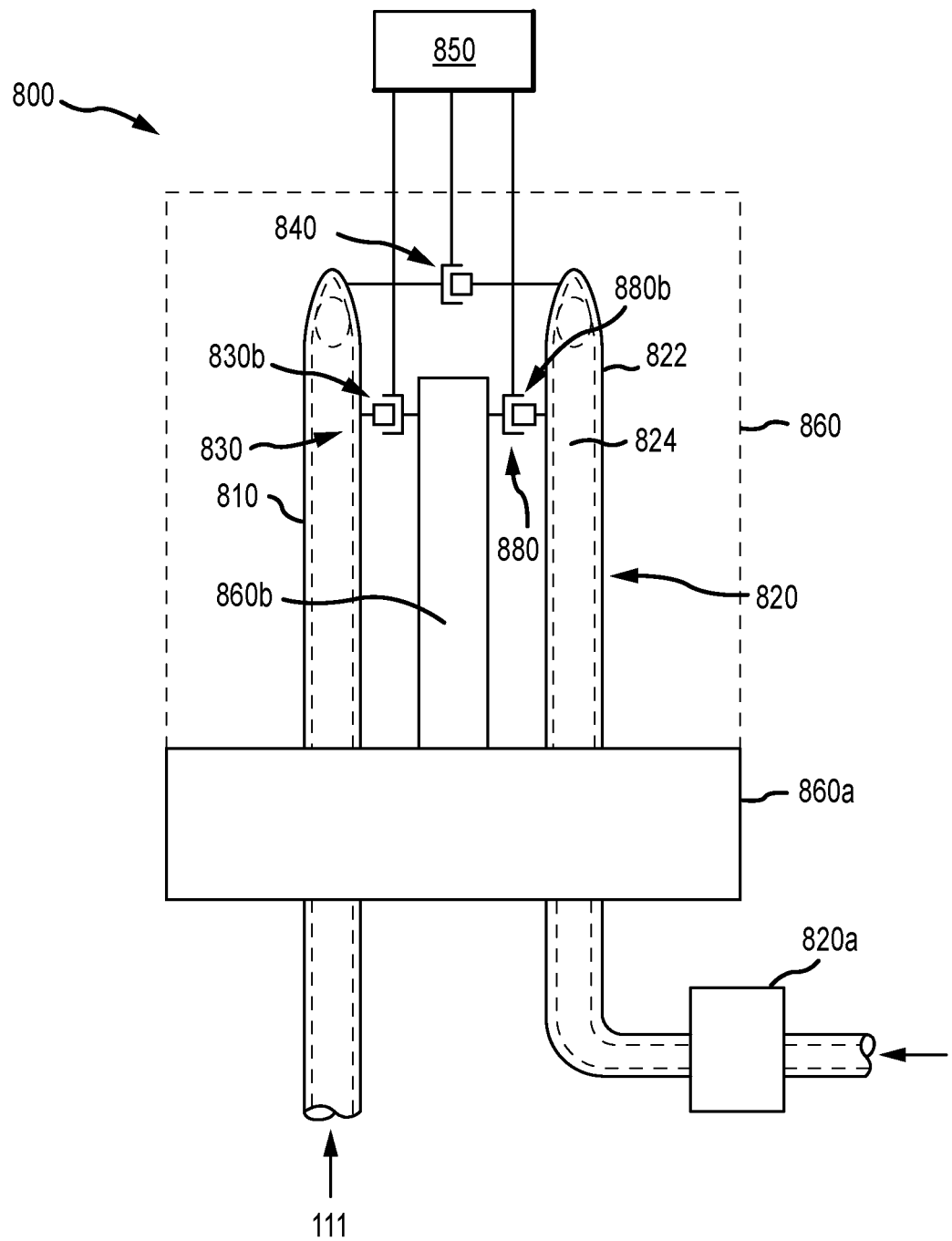

FIGS. 7 and 8 show vibratory meters including variable mass balance bars and balance sensors. As shown in FIG. 7, a vibratory meter 700 includes a variable mass balance bar 720 that is adjacent to a measuring conduit 710. The variable mass balance bar 720 is comprised of a balance body 722 and a balance fluid 724. As shown in FIG. 7, the vibratory meter 700 includes pickoff sensors 730 that are disposed between, and coupled to, the measuring conduit 710 and a case 760, which is mechanically coupled to the base 760a. The pickoff sensors 730 are comprised of a left pickoff sensor (not shown due to view) and a right pickoff sensor 730b. The vibratory meter 700 also includes balance sensors 780 that are disposed between, and coupled to, the variable mass balance bar 720 and the case 760. The balance sensors 780 are comprised of a first balance sensor (not shown due to view) and a second balance sensor 780*b*. The vibratory meter 700 also includes a driver 740 disposed between, and coupled to, the measuring conduit 710 and the variable mass balance bar 720.

As shown in FIG. 7, the balance sensors 780 are mechanically coupled to the case 760. The first balance sensor is also mechanically coupled to the variable mass balance bar 720. The second balance sensor 780*b* is also mechanically coupled to the measuring conduit 710. The balance sensors 780 may be configured to measure a displacement of the variable mass balance bar 720 relative to the case 760. The balance sensors 780 are also configured to provide balance sensor signals to the meter electronics 750.

As shown in FIG. 8, a vibratory meter 800 includes a variable mass balance bar 820 that is adjacent a plate 860*b*. The plate 860*b* is disposed between the variable mass balance bar 820 and a measuring conduit 810. The plate 860*b* is mechanically coupled to a base 860*a*, which is mechanically coupled to a case 860. Pickoff sensors 830 are disposed between, and coupled to, the measuring conduit 810 and the reference plate 860*b*. The pickoff sensors 830 comprise a left pickoff sensor (not shown due to view) and a right pickoff sensor 830*b*. A driver 840 is disposed between, and coupled to, the measuring conduit 810 and the variable mass balance bar 820.

Balance sensors 880 are disposed between, and coupled to, the plate 860*b* and the variable mass balance bar 820. The balance sensors 880 are comprised of a first balance sensor (not shown due to view) and a second balance sensor 880*b*. The balance sensors 880 may be configured to measure a displacement of the variable mass balance bar 820 relative to the case 860. The balance sensors 880 are also configured to provide balance sensor signals to the meter electronics 850.

As shown in FIGS. 7 and 8, the vibratory meters 700, 800 include an inlet valve 720*a*, 820*a*. The vibratory meters 700, 800 do not include an outlet valve. The inlet valves 720*a*, 820*a* are fluidly coupled to the inlets of the variable mass balance bars 720, 820. The inlet valves 720*a*, 820*a* are configured to receive the balance fluids 724, 824 from their respective sources, such as a mixer, and control a flow rate, such as a volume or mass flow rate, of the balance fluids 724, 824 provided to the balance bodies 722, 822. Accordingly, the mass of the balance fluids 724, 824 in the balance bodies 722, 822 may be controlled. For example, by controlling the flow rate of the balance fluids 724, 824 into and out of the balance bodies 722, 822 a temperature and/or volume of the balance fluids 724, 824 may be controlled.

Also as shown in FIGS. 7 and 8, the vibratory meters 700, 800 include the cases 760, 860. The cases 760, 860 are mechanically coupled to the bases 760*a*, 860*a*, which may be coupled to a reference structure, such as the plate 860*b* in FIG. 8. The measuring conduits 710, 810 extend through the bases 760*a*, 860*a* into a space formed by the cases 760, 860. The cases 760, 860, bases 760*a*, 860*a*, and plate 860*b* may be substantially rigid structures. The bases 760*a*, 860*a* may therefore be coincident with vibration nodes of the measuring conduits 710, 810 and the variable mass balance bars 720, 820. In addition, the cases 760, 860 and the plate 860*b* may be reference structures or surfaces. For example, surfaces on the cases 760, 860 and/or the plate 860*b* may be assumed to have zero displacement with respect to time when the measuring conduit 710, 810 and/or variable mass balance bar 720, 820 vibrate. Accordingly, a displacement of the measuring conduit 710, 810 and/or variable mass balance bar 720, 820 may be measured relative to the reference surface or reference structure, which may be the cases 760, 860 and/or plate 860*b*.

Due to the case 760, 860 and the plate 860*b* being a reference structure or reference surface, a displacement of the measuring conduit 710, 810 and the variable mass balance bar 720, 820 may be measured relative to a common reference structure or reference surface. In these examples, the case 760, 860 and plate 860*b* are assumed to not be vibrating and therefore any displacement of the measuring conduit 710, 810 and the variable mass balance bar 720, 820 may be measured and compared with each other.

As discussed above, the measuring conduit 710, 810 may be balanced when a resonance frequency of the measuring conduit 710, 810 containing the process material is equal to a resonance frequency of the variable mass balance bar 720, 820. Accordingly, by measuring the displacement of the measuring conduit 710, 810 containing the process material with the pickoff sensors 730, 830 and the displacement of the variable mass balance bar 720, 820 with the balance sensors 780, 880, one may calculate frequencies of the measuring conduit 710, 810 and the variable mass balance bar 720, 820. The frequencies may be determined by the meter electronics 750, 850 based on sensor signals provided by the pickoff sensors 730, 830 and the balance sensors 780, 880. When the frequency of the measuring conduits 710, 810 containing the process material are respectively equal to the frequencies of the variable mass balance bars 720, 820, then the measuring conduits 710, 810 are balanced by the variable mass balance bars 720, 820.

System for Balancing a Measuring Conduit

Figure 9:
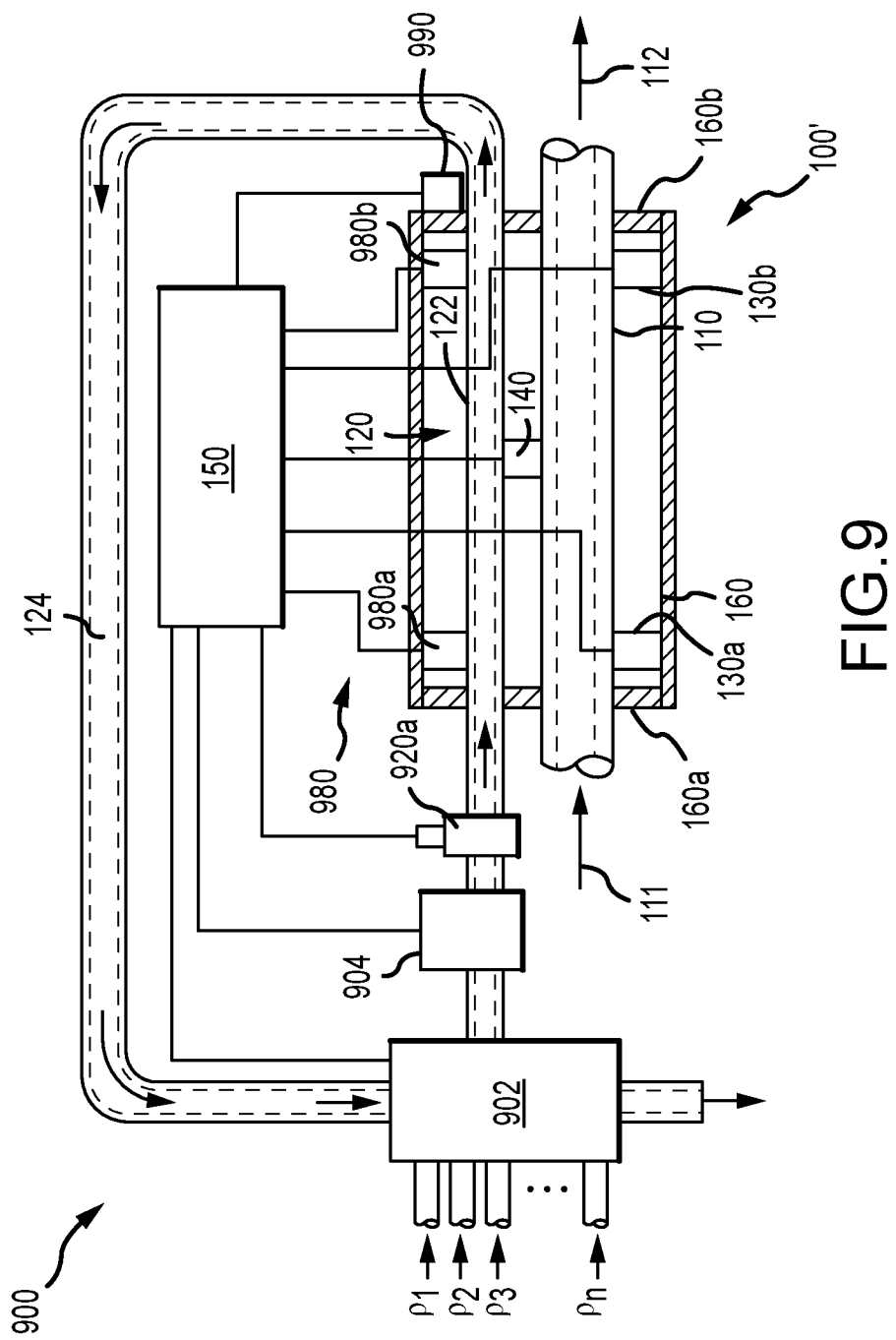
FIG. 9 shows a system 900 having a vibratory meter 100' including the variable mass balance bar 120.

FIG. 9 shows a system 900 having a vibratory meter 100' including the variable mass balance bar 120. As shown in FIG. 9, the variable mass balance bar 120 is adjacent to the measuring conduit 110. Ends of the measuring conduit 110 and the variable mass balance bar 120 are rigidly coupled together with a first case end 160*a* and a second case end 160*b* of a case 160. As shown in FIG. 9, a flow of the process material to be measured by the measuring conduit 110 is illustrated by arrows 111, 112. An inlet valve 920*a* is communicatively coupled to the meter electronics 150, and fluidly and mechanically coupled to the balance body 122. The inlet and outlet valve 920*a* is configured to control a flow of the balance fluid 124 provided to the balance body 122.

A left pickoff sensor 130*a* and a right pickoff sensor 130*b* are disposed between, and mechanically coupled to, the measuring conduit 110 and the case 160. The left and right pickoff sensors 130*a*, 130*b* are configured to measure a displacement of the measuring conduit 110 relative to the case 160. A driver 140 is disposed between and coupled to the measuring conduit 110 and the variable mass balance bar 120. The left pickoff sensor 130*a*, the right pickoff sensor 130*b*, and the driver 140 are shown as being communicatively coupled to the meter electronics 150. The meter electronics 150 may provide a drive signal to the driver 140 and receive sensor signals from the left pickoff sensor 130*a* and the right pickoff sensor 130*b* to measure properties of the material in the measuring conduit 110, such as density, mass flow rates, or the like. As will also be described in more detail in the following, the meter electronics 150 may be communicatively coupled to other devices.

As shown in FIG. 9, the measuring conduit 110 is a straight cylindrical tube, although any suitable shape may be employed. The measuring conduit 110 is shown as having an outer diameter. As illustrated by dashed lines, the measuring conduit 110 also has an inner diameter. The measuring conduit 110 is configured to oscillate when subjected to a vibratory force provided by, for example, the driver 140. The vibration may oscillate at a resonance frequency. The measuring conduit 110 is balanced by the variable mass balance bar 120.

The variable mass balance bar 120 has a mass that can be selected to balance the measuring conduit 110. For example, a density of the variable mass balance bar 120 may be selected to balance the measuring conduit 110. The variable mass balance bar 120 is shown as including a balance body 122. As shown in FIG. 9, the balance body 122 has a shape of a hollow cylindrical tube having a wall thickness. The balance body 122 may be comprised of materials and/or have a shape the same as, or similar to, the measuring conduit 110. As shown in FIG. 9, the balance body 122 has approximately the same length as the measuring conduit 110, although any suitable diameter may be employed. The balance body 122 has an outer diameter that is smaller than an outer diameter of the measuring conduit 110. The balance body 122 also includes an inner diameter (illustrated by dashed lines) of a cylindrical inner surface that extends along the length of the variable mass balance bar 120.

The variable mass balance bar 120 also includes a balance fluid 124. The balance fluid 124 is shown with arrows as entering and exiting the variable mass balance bar 120. More specifically, the balance fluid 124 is shown as entering the balance body 122 at an inlet proximate an inlet arrow, being conveyed by the cylindrical balance body 122, and provided by the cylindrical balance body 122 at an outlet proximate an outlet arrow. Accordingly, the balance fluid 124 may fill a space formed by the cylindrical inner surface of the balance body 122. The balance fluid 124 has properties that may ensure the variable mass balance bar 120 balances the measuring conduit 110. As a result, a measurement of a property of the process material in the measuring conduit 110 may be accurate even though the density of the process material may vary.

As shown in FIG. 9, at least one balance sensor 980 is comprised of a first balance sensor 980a and a second balance sensor 980b that are mechanically coupled to the case 160 and the variable mass balance bar 120. A single balance sensor may be employed in other systems or vibratory meters. As shown in FIG. 9, the first balance sensor 980a and the second balance sensor 980b are communicatively coupled to the meter electronics 150. The first balance sensor 980a and the second balance sensor 980b are configured to measure a displacement of the variable mass balance bar 120 relative to the case 160. The first and second balance sensors 980a, 980b are also configured to provide balance sensor signals to the meter electronics 150.

The case 160 and the first and second case ends 160a, 160b may be reference structures or surfaces. For example, surfaces on the case 160 and/or case ends 160a, 160b may be assumed to have zero displacement with respect to time when the measuring conduit 110 and/or variable mass balance bar 120 vibrate. Accordingly, a displacement of the measuring conduit 110 and/or variable mass balance bar 120 may be measured relative to the reference surface or reference structure, which may be the case 160.

Due to the case 160 and the case ends 160a, 160b being reference structures or reference surfaces, a displacement of the measuring conduit 110 and the variable mass balance bar 120 may be measured relative to a common reference structure or reference surface. In this example, the case 160 is assumed to not be vibrating or is vibrating without relative displacement of its surfaces and therefore any displacement of the measuring conduit 110 and the variable mass balance bar 120 may be measured and compared.

The system 900 also includes an accelerometer 990 that is mechanically coupled to the second case end 160b. The accelerometer 990 is communicatively coupled to the meter electronics 150. The accelerometer 990 is configured to detect an acceleration. For example, if the accelerometer 990 vibrates, the accelerometer 990 will produce an acceleration signal that may be proportional to an acceleration at a location. The accelerometer 990 may accordingly provide the acceleration signal to the meter electronics 150.

The system 900 includes a mixer 902. The mixer 902 is fluidly coupled to variable mass balance bar 120 and is communicatively coupled to the meter electronics 150. The mixer 902 is shown as receiving a plurality of balance fluid components, each having a corresponding component density $\rho_1, \rho_2, \rho_3 \ldots \rho_n$. The mixer 902 may receive the plurality of balance fluid components, mix the plurality of balance fluid components into the balance fluid 124, and provide the balance fluid 124 to the balance body 122. The mixer 902 is also configured to receive the balance fluid 124 from the vibratory meter 100' in a semi-closed loop system.

The mixer 902 may also be configured to condition the balance fluid 124. For example, the mixer 902 may heat and/or cool the balance fluid 124. Although the mixer 902 is shown as a single integrated device, it may be comprised of distinct sub-devices, where each sub-device has a control circuit. As shown in FIG. 9, the mixer 902 may include a control circuit that can control the mass of the balance fluid 124 by controlling a density of the balance fluid 124, as is described in more detail in the following.

The mixer 902 is shown as being comprised of a plurality of inlets, each of which is fluidly coupled to a corresponding balance fluid component. The mixer 902 may also include valves, such as flow rate valves, that regulate flow rates of a corresponding balance fluid component. The mixer 902 may also select one of, or mix two or more of, the plurality of balance fluid components into the balance fluid 124. For example, the mixer 402 may include a control circuit with a memory that stores the component densities $\rho_1, \rho_2, \rho_3, \ldots \rho_n$ of the plurality of balance fluid components. The control circuit may store and/or receive other values, such as a volume of the measuring conduit 110, a density of the process material in the measuring conduit 110, a volume of the balance body 122, or the like.

The system 900 also includes a density sensor 904 that is disposed between, and fluidly coupled to, the mixer 902 and the vibratory meter 100'. The density sensor 904 is communicatively coupled to the meter electronics 150. The density sensor 904 is configured to measure a density of the balance fluid 124 provided to the vibratory meter 100'. The measured density may be provided to the meter electronics 150, which may perform calculations using the measured density. Some calculations may include calculating a mass of the variable mass balance bar 120. By calculating the mass, and knowing the spring constant, of the variable mass balance bar 120, the meter electronics 150 may analytically determine if the variable mass balance bar 120 balances the measuring conduit 110.

If the meter electronics 150 analytically determines that the variable mass balance bar 120 does not balance the measuring conduit 110, then the meter electronics 150 may provide a signal to the mixer 902 indicating the measured density, the balancing density, or a difference between a balancing density (e.g., a density value that would analytically result in the variable mass balance bar 120 balancing the measuring conduit 110) and the measured density, or the like. The mixer 902 can use these values to select, adjust, etc., one or more of the balance fluid components so that the density of the balance fluid 124 is substantially the same as the balancing density.

Additionally or alternatively, the meter electronics 150 may determine if the measuring conduit 110 is balanced by using the acceleration signal provided by the accelerometer 990, the balance sensor signals provided by the at least one balance sensor 980, standard deviation of a zero offset, and/or a drive gain of the driver 140. For example, if the variable mass balance bar 120 is balancing the measuring conduit 110 containing the process material, then any vibration detected by the accelerometer 990 would not be due to an unbalanced vibratory meter 100'. Vibration detected in a balanced vibratory meter 100' may be due to other sources, such as vibrations from the process material, piping connected to the vibratory meter 100', environmental noise/vibrations, etc. These other sources may be filtered by, for example, a bandpass filter centered on a resonance frequency of the variable mass balance bar 120 and/or measuring conduit 110 containing the process material.

The at least one balance sensor 980 may also be used to determine if the variable mass balance bar 120 balances the measuring conduit 110 containing the process material. For example, as discussed above, the variable mass balance bar 120 may balance the measuring conduit 110 containing the process material when the resonance frequency of the variable mass balance bar 120 is equal to a resonance frequency of the measuring conduit 110. The at least one balance sensor 980 may detect a displacement (e.g., distance, velocity, and/or acceleration) of the variable mass balance bar 120 and provide a balance bar displacement signal to the meter electronics 150. The meter electronics 150 may determine if the resonance frequency of the variable mass balance bar 120 is equal to the resonance frequency of the measuring conduit 110 containing the process material.

The resonance frequency of the variable mass balance bar 120 may be measured by varying a density/mass of the balance fluid and/or a frequency of the drive signal provided to the driver 140. For example, the mixer 902 may increase or decrease the density of the balance fluid 124. The meter electronics 150 may measure an amplitude of the accelerometer signal provided by the accelerometer 990 while the density of the balance fluid 124 is being swept to determine a balanced density value. The balance density value may correspond to when the amplitude of the accelerometer signal is minimal over the swept range of densities of the balance fluid 124.

Additionally, or alternatively, one or more frequencies of the drive signal provided to the driver 140 may be varied such that a drive gain, or other variable corresponding to an amplitude of the drive signal, may be minimized. The one or more frequencies of the drive signal may include a component frequency of the drive signal. In other words, the drive signal may be comprised of one or more components having distinct sinusoidal frequencies. For example, the drive signal may be comprised of a component at or tracking a resonance frequency of the measuring conduit 110 containing the process material and a component at or tracking a resonance frequency of the variable mass balance bar 120. Accordingly, an amplitude of the component corresponding to the resonance frequency of the variable mass balance bar 120 may be minimized. The component corresponding to the resonance frequency of the variable mass balance bar 120 may be tracked by minimizing the drive gain while varying the frequency of the component.

The meter electronics 150 may determine that the variable mass balance bar 120 balances the measuring conduit 110 containing the process material in other ways, additional or alternative to above. For example, the meter electronics 150 may monitor a drive gain of the drive signal provided to the driver 140 and if the drive gain is excessively high, then the meter electronics 150 may determine that the vibratory meter 100' is not balanced. Additionally, or alternatively, the meter electronics 150 may determine that the variable mass balance bar 120 balances the measuring conduit 110 containing the process material when the frequency of the component corresponding to the variable mass balance bar 120 is equal to the frequency of the component corresponding to the measuring conduit 110 containing the process material (e.g., when their respective drive gains are minimized).

The drive gain may be a measure of a drive signal power required to maintain an amplitude of the measuring conduit 110 containing the process material. For example, the drive gain may be a ratio of a drive signal amplitude and one or more signal amplitudes of the signals provided by the at least one balance sensor 980 and/or the sensor signals provided by the left and right pickoff sensors 130a, 130b. That is, the drive gain may be determined for and correspond to the variable mass balance bar 120 and/or the measuring conduit 110 containing the process material.

The meter electronics 150 may also determine that the vibratory meter 100' is balanced by monitoring a zero. When the vibratory meter 100' is balanced, the zero will be equal to a balanced state zero. That is, when the process material is not flowing through the measuring conduit, the time or phase delay may be equal to a previously determined time or phase delay measured when the vibratory meter 100' is balanced. The balanced state zero may be determined, for example, by using the accelerometer 990, density sensor 904, the at least one balance sensor 980, and/or etc. For example, the vibratory meter 100' may be balanced using the accelerometer 990 to minimize vibration and then the corresponding zero stored as the balanced state zero. The balanced state zero may also be correlated with process conditions, such as for example, process material, temperature, density readings, pressure, etc.

Balancing a Vibratory Meter

Figure 10:
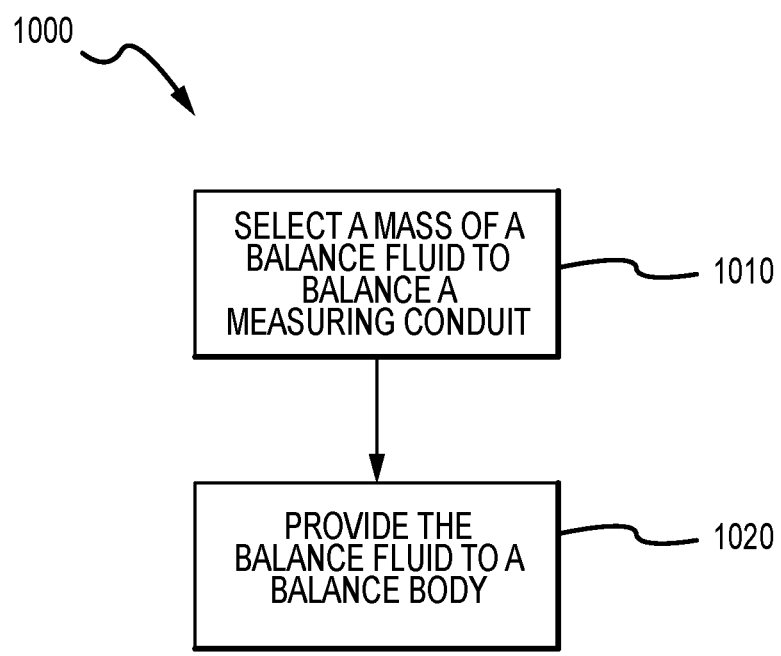
FIG. 10 shows a method 1000 of balancing a measuring conduit using a variable mass balance bar.

FIG. 10 shows a method 1000 of balancing a measuring conduit using a variable mass balance bar. As shown in FIG. 10, the method 1000 includes step 1010, where the method 1000 selects a mass of a balance fluid to balance a measuring conduit. The balance fluid may be the balance fluids 124-324b, 524-824 described above. In step 1020, the method 1000 provides the balance fluid to a balance body. The balance body may be the balance body 122-322b, 522-822 described above, although any suitable balance body may be employed. The method 1000 may be comprised of other steps. For example, selecting the mass of the balance fluid to balance a measuring conduit may comprise selecting a density of the balance fluid. The density may be selected in any suitable manner, such as selecting a particular fluid, mixing fluid components, or the like. The fluid or fluid components may or may not be a process material. A non-process material may be advantageous because a temperature of the balance may be controlled, rather than determined by the process material being measured. The method 1000 may also include providing the balance fluid to at least one inlet configured to receive the balance fluid. Providing the balance fluid to the balance body may also include mixing a plurality of balance fluid components into the balance fluid and providing the balance fluid to the balance body. Accordingly, the variable mass balance bar may balance the measuring conduit containing the process material.

A resonance frequency of the balance body containing the balance fluid may be equal to a resonance frequency of the measuring conduit containing the process material. Accordingly, the resonance frequency of the variable mass balance bar may be equal to the resonance frequency of the measuring conduit containing the process material. The frequencies may be equal to each other according to above equations [1]-[3]. In one example, the mass of the balance body may be equal to a mass of the measuring conduit. Accordingly, the stiffness of the balance body may be the same as the stiffness of the measuring conduit. Alternatively, the mass of the balance body may not be equal to the mass of the measuring conduit. Accordingly, the stiffness of the measuring conduit may not be equal to the stiffness of the measuring conduit. For example, if the mass of the balance body is less than the mass of the measuring conduit, then the stiffness of the balance body may be greater than the stiffness of the measuring conduit. However, the above depends on the mass of the process material, as above equation [3] illustrates.

The method 1000 may further comprise other steps such as configuring the balance body to be mechanically coupled to the measuring conduit. For example, couplers or case ends may be affixed to ends of the balance body and ends of the measuring conduit. However, any suitable mechanical coupling may be employed. Additionally, or alternatively, at least one balance sensor may be coupled to the variable mass balance bar and a reference structure of a vibratory meter. The balance sensor may be used to determine if the variable mass balance bar balances the measuring conduit. For example, the balance sensor may be used to determine if a resonance frequency of the measuring conduit is equal a resonance frequency of the variable mass balance bar, as is described above. Additionally, or alternatively, an accelerometer may be coupled to the reference structure to, for example, sense a vibration of the reference structure with the accelerometer. The accelerometer and/or balance sensor may be used to determine if the reference structure is vibrating due to the variable mass balance bar not balancing the measuring conduit containing the process material.

Balancing the vibratory meter, such as the vibratory meters 100-300, 500-800 described above, may include monitoring one or more variables. For example, referring to FIG. 9, the drive gain signal provided to the driver 140 and the acceleration signal from the accelerometer 990 may be monitored while the mixer 902 varies a density of the balance fluid 124 provided to the balance body 122. If the frequency of the component of the drive signal corresponding to the variable mass balance bar 120 and the frequency of the component of the drive signal corresponding to the measuring conduit 110 containing the process material are substantially equal and the acceleration signal from the accelerometer 990 is minimized, then the meter electronics 150 may determine that the vibratory meter 100' is balanced.

As can be appreciated, each variable may have a corresponding threshold. These thresholds may also be correlated depending on process conditions. For example, the frequencies of the components of the drive signal may be within a threshold of each other and the amplitude of the acceleration may be less than a threshold before the meter electronics 150 may determine that the vibratory meter 100' is balanced. The determination that the vibratory meter 100' is balanced may be used in various ways, such as terminating the method 1000, an indication that measured mass flow rate may be accurate, or the like. The variables may also be quantified to provide a measuring of the accuracy of the measured mass flow rate, etc.

The above describes the vibratory meters 100-300, 500-800 that include variable mass balance bars 120-320, 520-820, as well as systems 400, 900 having vibratory meters 100, 100' that include variable mass balance bars 120, that can be used to balance the measuring conduits 110-310, 510-810. By balancing the vibratory meters 100-300, 500-800, rather than use a fixed mass balance bar, the vibratory meters 100-300, 500-800 may accurately measure a property of the process material.

The balanced vibratory meters 100-300, 500-800 may also not vibrate even though properties of the process material may vary. Accordingly, for example, a single straight conduit configuration may be employed over a wide range of process materials. This allows the benefits of the straight conduit configurations, such as a higher frequency operating mode, to be realized in a wider range of process measurement applications. Other configurations may have particular benefits that may be similarly realized, such as very low frequency operation, desired flow capacities, etc.

Balancing the vibratory meters 100-300, 500-800 may also compensate for changes in the measuring conduits 110-310, 510-810. For example, a mass of the measuring conduits 110-310, 510-810 may increase or decrease due to erosion, corrosion, coating, modification (e.g., modifying the pickoff sensors 130a, 130b), maintenance that replaces a portion of or the entire measuring conduits 110-310, 510-810, or the like. This can reduce life-cycle costs by extending the operating life of the vibratory meters 100-300, 500-800, allowing for part-level repairs where an assembly level repair may have previously been required, or the like.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other variable mass balance bars, vibratory meters including the variable mass balance bars, or systems and methods for balancing a measuring conduit using the variable mass balance bars and not just to the embodiments described above and shown in the accompanying figures. Accordingly, the scope of the embodiments described above should be determined from the following claims.

We claim:

1. A vibratory meter (100-300, 500-800) with a variable mass balance bar (120-320, 520-820), the vibratory meter (100-300, 500-800) comprising:
    a measuring conduit (110-310, 510-810);
    the variable mass balance bar (120-320, 520-820) mechanically coupled to the measuring conduit (110-310, 510-810), wherein a mass of a balance fluid of the variable mass balance bar (120-320, 520-820) is selected to balance the measuring conduit (110-310, 510-810) containing a process material; and
a meter electronics (150, 550, 750, 850) communicatively coupled to the measuring conduit (110, 510, 710, 810) and a balance sensor (780, 880), the meter electronics (150, 550, 750, 850) being configured to at least one of determine if the variable mass balance bar (120-320, 520, 720, 820) balances the measuring conduit (110-310, 510, 710, 810) containing the process material and select the mass of the balance fluid of the variable mass balance bar (120-320, 520, 720, 820) by controlling a density and/or a volume of the balance fluid of the variable mass balance bar (120-320, 520, 720, 820).

2. The vibratory meter (100-300, 500-800) of claim 1, wherein a resonance frequency of the variable mass balance bar (120-320, 520-820) is equal to a resonance frequency of the measuring conduit (110-310, 510-810) containing the process material.

3. The vibratory meter (100-300, 500-800) of claim 1, wherein:
the mass of the variable mass balance bar (120-320, 520-820) is one of equal to and not equal to a mass of the measuring conduit (110-310, 510-810) containing the process material; and
a stiffness of the variable mass balance bar (120-320, 520-820) is one of equal to and not equal to a stiffness of the measuring conduit (110-310, 510-810).

4. The vibratory meter (100-300, 500-800) of claim 1, wherein the variable mass balance bar (120-320, 520-820) includes at least one inlet and at least one outlet, wherein the mass of the variable mass balance bar (120-320, 520-820) is between the inlet and the outlet.

5. The vibratory meter (700, 800) of claim 1, further comprising the at least one balance sensor (780, 880) mechanically coupled to the variable mass balance bar (720, 820) and a reference structure (760, 860b) of the vibratory meter (700, 800) and communicatively coupled to the meter electronics (750, 850), the meter electronics (750, 850) being configured to determine if the variable mass balance bar (720, 820) balances the measuring conduit (710, 810) containing the process material.

6. The vibratory meter (700, 800) of claim 1, wherein the meter electronics (750, 850) being configured to determine if the variable mass balance bar (720, 820) balances the measuring conduit (710, 810) containing the process material comprises the meter electronics (750, 850) being configured to determine if a resonance frequency of the measuring conduit (710, 810) containing the process material is equal to a resonance frequency of the variable mass balance bar (720, 820).

7. A system (400, 900) including a vibratory meter (100') including a variable mass balance bar (120), the system (400, 900) comprising:
the vibratory meter (100, 100') comprising:
a measuring conduit (110);
the variable mass balance bar (120) mechanically coupled to the measuring conduit (110), wherein a mass of a balance fluid of the variable mass balance bar (120) is selected to balance the measuring conduit (110) containing a process material; and
a meter electronics (150) communicatively coupled to the measuring conduit (110), the meter electronics (150) being configured to at least one of determine if the variable mass balance bar (120) balances the measuring conduit (110) containing the process material and select the mass of the balance fluid of the variable mass balance bar (120); and
at least one of a flow control valve (920a) and a mixer (402, 902) communicatively coupled to the meter electronics (150), the flow control valve (820a, 920a) and/or the mixer (920) being configured to control the mass of the balance fluid of the variable mass balance bar by controlling a density and/or a volume of the balance fluid (124) of the variable mass balance bar (120) by controlling a density and/or a volume of the balance fluid of the variable mass balance bar (120-320, 520, 720, 820).

8. The system (400, 900) of claim 7, wherein a resonance frequency of the variable mass balance bar (120) is equal to a resonance frequency of the measuring conduit (110) containing the process material.

9. The system (400, 900) of claim 7, wherein:
the mass of the variable mass balance bar (120) is one of equal to and not equal to a mass of the measuring conduit (110) containing the process material; and
a stiffness of the variable mass balance bar (120) is one of equal to and not equal to a stiffness of the measuring conduit (110).

10. The system (400, 900) of claim 7, wherein the variable mass balance bar (120) includes at least one inlet and at least one outlet, wherein the mass of the balance fluid of the variable mass balance bar (120) is between the inlet and the outlet.

11. The system (400, 900) of claim 7, wherein the vibratory meter (100') further comprises a reference structure (160, 160a, 160b) coupled to the variable mass balance bar (120) and further comprising at least one balance sensor (980) mechanically coupled to the variable mass balance bar (120) and the reference structure (160, 160a, 160b).

12. The system (900) of claim 11, further comprising an accelerometer (990) coupled to the reference structure (160, 160a, 160b) and communicatively coupled to the meter electronics (150), wherein the accelerometer (990) is configured to sense a vibration of the reference structure (160, 160a, 160b).

13. The system (900) of claim 11, wherein the meter electronics (150) being configured to determine if the variable mass balance bar (120) balances the measuring conduit (110) comprises the meter electronics (150) being configured to determine if the reference structure (160, 160a, 160b) of the vibratory meter (100) is vibrating due to the variable mass balance bar (120) not balancing the measuring conduit (110) containing the process material.

14. The system (900) of claim 7, wherein the meter electronics (150) being configured to determine if the variable mass balance bar (120) balances the measuring conduit (110) containing the process material comprises the meter electronics (150) being configured to determine if a resonance frequency of the measuring conduit (110) containing the process material is equal to a resonance frequency of the variable mass balance bar (120).

15. The system (400, 900) of claim 7, wherein the mixer (402, 902) is fluidly coupled to the variable mass balance bar (120), the mixer (402, 902) being configured to mix a plurality of balance fluid components into the balance fluid (124) and provide the balance fluid (124) to the variable mass balance bar (120).

16. A method of balancing a measuring conduit with a variable mass balance bar, the method comprising:
selecting a mass of a balance fluid to balance a measuring conduit containing a process material;
providing the balance fluid to a balance body; and determining if the variable mass balance bar balances the measuring conduit containing the process fluid;

wherein the mass of the balance fluid is selected by controlling a density and/or a volume of the balance fluid of the variable mass balance bar.

17. The method of claim 16, wherein:

the mass of the balance body is one of equal to and not equal to a mass of the measuring conduit; and a stiffness of the balance body is one of equal to and not equal to a stiffness of the measuring conduit.

18. The method of claim 16, further comprising configuring the balance body to be mechanically coupled to the measuring conduit.

19. The method of claim 16, wherein the balance fluid is a non-process material and/or a process material.

20. The method of claim 16, wherein providing the balance fluid to the balance body comprises providing the balance fluid to at least one inlet configured to receive the balance fluid.

21. The method of claim 16, further comprising coupling at least one balance sensor to the variable mass balance bar and a reference structure of a vibratory meter.

22. The method of claim 21, further comprising using the balance sensor to determine if the variable mass balance bar balances the measuring conduit containing the process material.

23. The method of claim 22, wherein using the balance sensor to determine if the variable mass balance bar balances the measuring conduit containing the process material comprises using the balance sensor to determine if a resonance frequency of the measuring conduit is equal to a resonance frequency of the variable mass balance bar.

24. The method of claim 21, further comprising coupling an accelerometer to the reference structure and sensing a vibration of the reference structure with the accelerometer.

25. The method of claim 21, further comprising determining if the reference structure is vibrating due to the variable mass balance bar not balancing the measuring conduit containing the process material.

26. The method of claim 16, wherein providing the balance fluid to the balance body comprises mixing a plurality of balance fluid components into the balance fluid and providing the balance fluid to the balance body.

* * * * *